United States Patent
Baessler et al.

(10) Patent No.: US 10,037,435 B2
(45) Date of Patent: *Jul. 31, 2018

(54) PROVIDING SECURE INDEXES FOR SEARCHING ENCRYPTED DATA

(71) Applicant: International Business Machines Corporation, Armonk, NY (US)

(72) Inventors: Michael Baessler, Neckartenzlingen (DE); Jochen Doerre, Boeblingen (DE); Thomas A. P. Hampp-Bahnmueller, Stuttgart (DE); Philipp Hoffmann, Weil im Schoenbuch (DE); Daniel Pittner, Steinenbronn (DE); Werner Schollenberger, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,134

(22) Filed: Aug. 11, 2016

(65) Prior Publication Data

US 2017/0060940 A1 Mar. 2, 2017

Related U.S. Application Data

(63) Continuation of application No. 14/835,816, filed on Aug. 26, 2015, now Pat. No. 9,633,219.

(51) Int. Cl.
*G06F 21/62* (2013.01)
*H04L 9/14* (2006.01)
(Continued)

(52) U.S. Cl.
CPC .... *G06F 21/6227* (2013.01); *G06F 17/30619* (2013.01); *G06F 17/30657* (2013.01);
(Continued)

(58) Field of Classification Search
CPC ............. G06F 17/301; G06F 17/30106; G06F 17/30312–17/30342;
(Continued)

(56) References Cited

U.S. PATENT DOCUMENTS 8,079,065 B2 12/2011 Sacson et al.
8,281,153 B2 10/2012 Kang et al.
(Continued)

FOREIGN PATENT DOCUMENTS

CN 1588365 A 3/2005
CN 102024054 A 4/2011

OTHER PUBLICATIONS

Chuah et al. "Privacy-aware BedTree Based Solution for Fuzzy Multi-keyword Search over Encrypted Data". 2011 31st International Conference on Distributed Computing Systems Workshops; DOI 10.1109/ICDCSW.2011.11. <http://ieeexplore.ieee.org/iel5/5960724/5961342/05961500.pdf>.*

(Continued)

*Primary Examiner* — Kevin Bechtel
(74) *Attorney, Agent, or Firm* — David B. Woycechowsky

(57) ABSTRACT

Providing an encrypted search index for performing searches on encrypted documents, the method comprising: (i) providing a set of documents, the documents comprising a plurality of unencrypted phrases; (ii) providing a master key; (iii) providing, based on the master key, for each phrase a set of encryption keys comprising one or more encryption keys; (iv) selecting, for each phrase, one encryption key of the set of encryption keys; (v) encrypting each phrase with the selected encryption key; and (vi) building an index based on the encrypted phrases, the index comprising information regarding which encrypted phrase is comprised within a certain document.

6 Claims, 7 Drawing Sheets

(51) Int. Cl.
*G06F 17/30* (2006.01)
*H04L 29/06* (2006.01)

(52) U.S. Cl.
CPC ............ *H04L 9/14* (2013.01); *H04L 63/0428* (2013.01); *H04L 63/06* (2013.01); *H04L 2463/061* (2013.01)

(58) Field of Classification Search
CPC .................... G06F 17/30613–17/30631; G06F 17/30657–17/30675; G06F 21/602; G06F 21/6218–21/6281; H04L 9/14–9/16; H04L 63/06
See application file for complete search history.

(56) References Cited

U.S. PATENT DOCUMENTS

| | | | | |
|---|---|---|---|---|
| 9,288,039 | B1* | 3/2016 | Monet | H04L 9/008 |
| 2006/0265563 | A1* | 11/2006 | Goettfert | G06F 12/1408 711/164 |
| 2011/0173438 | A1 | 7/2011 | Matzkel | |
| 2013/0067225 | A1* | 3/2013 | Shochet | G06F 21/6209 713/165 |
| 2013/0159694 | A1 | 6/2013 | Chiueh et al. | |
| 2016/0246828 | A1 | 8/2016 | Cho et al. | |
| 2016/0292451 | A1* | 10/2016 | Diep | G06F 21/6227 |

OTHER PUBLICATIONS

Song et al., "Practical Techniques for Searches on Encrypted Data". <http://www.cs.berkeley.edu/~dawnsong/papers/se.pdf>.*
Appendix P—List of Patents or Patent Applications Treated as Related, Filed Aug. 15, 2016, 2 pages.
Boneh et al., "Functional Encryption: Definitions and Challenges", pp. 1-23, provided in main idea of disclosure dated Jun. 6, 2014, <http://eprint.iacr.org/2010/543.pdf>.
Curtmola et al., "Searchable Symmetric Encryption: Improved Definitions and Efficient Constructions", pp. 1-36, provided in main idea of disclosure dated Jun. 6, 2014, <www.cs.ucla.edu/~rafail/PUBLIC/SSE.ppt>.
Goldreich et al., "Software Protection and Simulation on Oblivious RAMs", pp. 1-43, provided in main idea of disclosure dated Jun. 6, 2014, <http://web.cs.ucla.edu/~rafail/PUBLIC/09JACM.pdf>.
Kamara, Seny, "How to Search on Encrypted Data: Introduction (Part 1)", Outsourced Bits, provided in main idea of disclosure dated Jun. 6, 2014, <http://outsourcedbits.org/2013/10/06/how-to-search-on-encrypted-data-part-1/>, 2 pages.
Kamara, Seny, "How to Search on Encrypted Data: Deterministic Encryption (Part 2)", Outsourced Bits, provided in main idea of disclosure dated Jun. 6, 2014, <http://outsourcedbits.org/2013/10/14/how-to-search-on-encrypted-data-part-2/>, 4 pages.
Kamara, Seny, "How to Search on Encrypted Data: Functional Encryption (Part 3)", Outsourced bits, provided in main idea of disclosure dated Jun. 6, 2014, 3 pages, <http://outsourcedbits.org/2013/10/30/how-to-search-on-encrypted-data-part-3/>.
Kamara, Seny, "How to Search on Encrypted Data: Oblivious RAMs (Part 4)", Outsourced bits, provided in main idea of disclosure dated Jun. 6, 2014, <http://outsourcedbits.org/2013/12/20/how-to-search-on-encrypted-data-part-4-oblivious-rams/>, 8 pages.
Song et al., "Practical Techniques for Searches on Encrypted Data", provided in main idea of disclosure dated Jun. 6, 2014, 12 pages, <http://www.cs.berkeley.edu/~dawnsong/papers/se.pdf>.
Waters, Brent, "Functional Encryption: Beyond Public Key Cryptography", provided in main idea of disclosure dated Jun. 6, 2014, pp. 1-37, <http://www.cs.utexas.edu/~bwaters/presentations/files/functional.ppt>.
"Brown Corpus", Wikipedia, page last modified on Nov. 4, 2014, at 02:20, 6 pages, <http://en.wikipedia.org/wiki/Brown_Corpus>.
"Secure two-party computation", Wikipedia, page last modified on May 3, 2013, at 21:47, 1 page, <https://en.wikipedia.org/wiki/Secure_two-party_computation>.
"Wiktionary:Frequency lists/German subtitles 1000", Wiktionary, page last modified on Mar. 23, 2014, at 16:46, 25 pages, <https://en.wiktionary.org/wiki/Wiktionary:Frequency_lists/German_subtitles_1000>.
"Zipf's law", Wikipedia, page last modified on May 29, 2015, at 23:36, <https://en.wikipedia.org/wiki/Zipf's_law>, 4 pages.
Baessler et al., "Providing Secure Indexes for Searching Encrypted Data", U.S. Appl. No. 14/835,816, filed Aug. 26, 2015, 35 pages.
Chuah et al., "Privacy-aware BedTree Based Solution for Fuzzy Multi-keyword Search over Encrypted Data", 2011 31st International Conference on distributed Computing Systems Workshops, IEEE Computer Society, pp. 273-281.

* cited by examiner

PROVIDING SECURE INDEXES FOR SEARCHING ENCRYPTED DATA

BACKGROUND

The present invention relates to searching encrypted data and more specifically, to a method for providing indexes for searching encrypted data. Even more specifically, the present document relates to methods for establishing secure indexes and performing searches on encrypted data using a distributed computing environment (for example, a cloud environment).

SUMMARY

According to an aspect of the present invention, there is a method, computer program product and/or system for providing an encrypted search index for performing searches on encrypted documents, that performs the following operations (not necessarily in the following order): (i) providing a set of documents, the documents including a plurality of unencrypted phrases; (ii) providing a master key; (iii) providing, based on the master key and respectively for each unencrypted phrase, a set of encryption key(s); (iv) selecting, for each unencrypted phrase, a selected encryption key of the set of encryption key(s) respectively corresponding to the unencrypted phrase; (v) encrypting each unencrypted phrase with the selected encryption key corresponding to the unencrypted phrase to yield an encrypted phrase corresponding to the unencrypted phrase; and (vi) building an index based on the encrypted phrases, the index including information indicating which encrypted phrase is included within each document of the set of documents.

According to an aspect of the present invention, there is a method, computer program product and/or system for searching phrases in an encrypted search index, that performs the following operations (not necessarily in the following order): (i) providing an encrypted search index including a plurality of encrypted phrases; (ii) providing a search query to be applied on the search index, the search query including set of unencrypted phrase(s) to be searched; (iii) providing a master key; (iv) providing, based on the master key, a set of encryption key(s) for each phrase of the set of unencrypted phrase(s); (v) generating a set of encrypted phrase(s) respectively corresponding to the set of unencrypted phrase(s) by encrypting the each unencrypted phrase of the set of unencrypted phrase(s) respectively based on its corresponding set of encryption key(s); (vi) generating a set of encrypted search query(ies) corresponding to the set of encrypted phrase(s); and (vii) providing the set of encrypted search query(ies) to a search engine designed to perform searches on the encrypted search index.

BRIEF DESCRIPTION OF THE DRAWINGS

In the following embodiments of the invention are explained in greater detail, by way of example only, making reference to the drawings in which.

DETAILED DESCRIPTION

Figure 1:
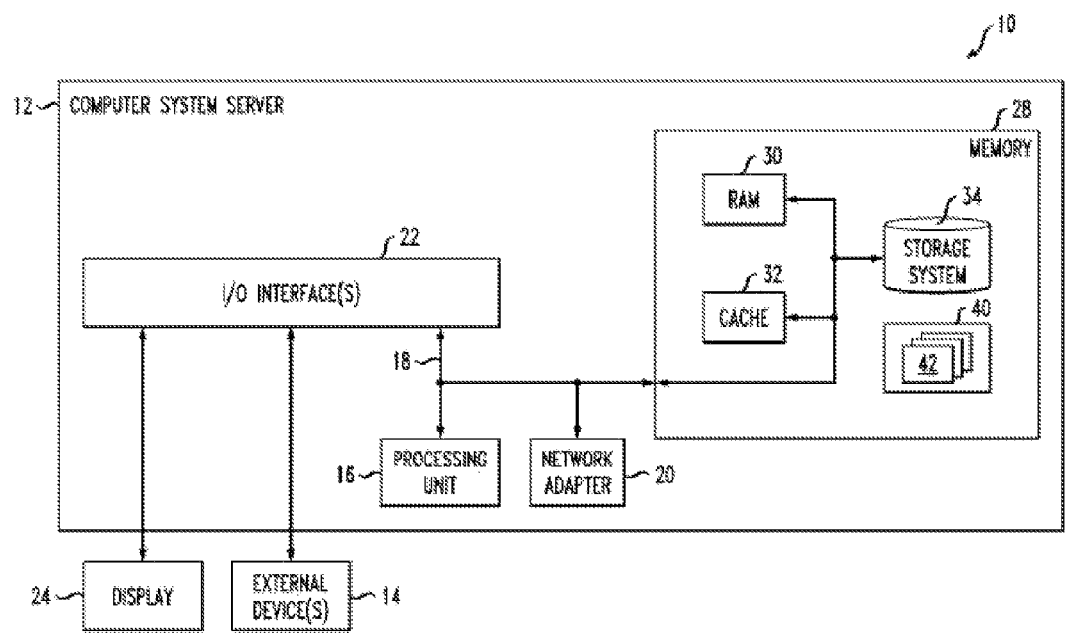
FIG. 1 depicts a cloud computing node according to an embodiment of the present invention.

In one aspect, a computer-implemented method for providing an encrypted search index for performing searches on encrypted documents is provided. The method comprises:
  providing a set of documents, the documents comprising a plurality of unencrypted phrases;
  providing a master key;
  providing, based on the master key, for each phrase a set of encryption keys comprising one or more encryption keys;
  selecting, for each phrase, one encryption key of the set of encryption keys;
  encrypting each phrase with the selected encryption key; and
  building an index based on the encrypted phrases, the index comprising information regarding which encrypted phrase is comprised within a certain document.

According to a further aspect, a computer-implemented method for searching phrases in an encrypted search index is provided. The method comprises:
  providing an encrypted search index including a plurality of encrypted phrases;
  providing a search query to be applied on the search index, the search query including at least one phrase to be searched;
  providing a master key;
  providing, based on the master key, a set of encryption keys comprising one or more encryption keys for the at least one phrase;
  generating a set of encrypted phrases by encrypting the at least one phrase based on the set of encryption keys;
  generating a set of encrypted search queries, the set of encrypted search queries including multiple encrypted search queries covering the encrypted phrases included in the set of encrypted phrases; and
  providing the set of encrypted search queries to a search engine for processing searches on the encrypted search index.

According to a further aspect, a computer program product for establishing an encrypted search index for performing searches on encrypted documents is provided. The computer program product comprises a computer readable storage medium having program instructions embodied therewith, the program instructions executable by a processor to cause the processor to execute the method comprising:
  providing a set of documents, the documents comprising a plurality of unencrypted phrases;
  providing a master key;
  providing, based on the master key, for each phrase a set of encryption keys comprising one or more encryption keys;
  selecting, for each phrase, one encryption key of the set of encryption keys;
  encrypting each phrase with the selected encryption key; and building an index based on the encrypted phrases, the index comprising information regarding which encrypted phrase is comprised within a certain document.

According to a further aspect, a computer program product for searching phrases in an encrypted search index is provided. The computer program product comprises a computer readable storage medium having program instructions embodied therewith, the program instructions executable by a processor to cause the processor to execute the method comprising:

providing an encrypted search index including a plurality of encrypted phrases;
providing a search query to be applied on the search index, the search query including at least one phrase to be searched;
providing a master key;
providing, based on the master key, a set of encryption keys comprising one or more encryption keys for the at least one phrase;
generating a set of encrypted phrases by encrypting the at least one phrase based on the set of encryption keys;
generating a set of encrypted search queries, the set of encrypted search queries including multiple encrypted search queries covering the encrypted phrases included in the set of encrypted phrases; and
providing the set of encrypted search queries to a search engine for processing searches on the encrypted search index.

According to an example, the method for establishing a search index may select the encryption key out of the set of encryption keys based on a statistical method, for example based on a statistical distribution function. Example candidates for distribution functions may be, for example, chi square, Gaussian, etc. By means of said statistical methods, a random selection of a key based on given input parameters, for example the phrase to be indexed and the set of encryption keys is obtained.

According to an example of the method for establishing a search index, a frequency parameter for each phrase included in the documents is determined based on a frequency evaluation scheme, the frequency parameter indicating the number of encryption keys to be included in the set of encryption keys. The frequency evaluation scheme may use, for example, a frequency list, said frequency list comprising information regarding the frequency of usage of a certain phrase. Based on said frequency of usage, the number of encryption keys to be included in the set of encryption keys is determined.

According to an example of the method for establishing a search index, the frequency evaluation scheme is adapted to assign a number of encryption keys to a certain phrase based on the frequency of usage of said phrase indicated by a reference frequency list. There are multiple reference frequency lists available, which count distinct orthographic words, including inflected forms, for example TV and movie scripts, Project Gutenberg etc. which may be used in the methods according to the present invention.

According to an example of the method for establishing a search index, the phrases are formed by words and/or word fragments of the documents.

According to an example of the method for establishing a search index, the word fragments are formed by a front portion of the word. In other words, the word fragments are constituted by a set of characters being arranged at the beginning of the respective word.

According to an example of the method for establishing a search index, each word is segmented in one or more front portions comprising a word fragment length above a certain threshold value.

According to an example of the method for establishing a search index, the word fragments are formed by choosing word segments based on a sliding window moving across the words. The sliding window may cover a certain number of characters. For example, the word fragments are obtained by using n-grams of a certain size, for example a "bigram" with a size of two characters or a "trigram" with a size of three characters.

According to an example of the method for searching phrases in an encrypted search index, a frequency parameter for the at least one phrase included in the search query is determined based on a frequency evaluation scheme, the frequency parameter indicating the number of encryption keys to be included in the set of encryption keys. The frequency evaluation scheme may use, for example, a frequency list, said frequency list comprising information regarding the frequency of usage of a certain phrase. Based on said frequency of usage, the number of encryption keys to be included in the set of encryption keys is determined.

According to an example of the method for searching phrases in an encrypted search index, the frequency evaluation scheme is adapted to assign a number of encryption keys to a certain phrase based on the frequency of usage of said phrase indicated by a reference frequency list.

According to an example of the method for searching phrases in an encrypted search index, each synonymous encrypted search query comprises the same logical structure and being constituted by encrypting the at least one phrase by one of said encryption keys included in the set of encryption keys. For example, a search query for searching a certain word within an encrypted document comprises an encrypted word which has been encrypted by one of said encryption keys included in the set of encryption keys. In case that the search query includes a logical operator for combining at least two phrases (for example "cat AND dog"), all search queries provided to the search engine comprise the same logical operator.

According to an example of the method for searching phrases in an encrypted search index, the search query comprises at least a first and a second query portion being logically linked by an operator, the set of encrypted search queries comprising all permutations of first query portions being encrypted by a first set of encryption keys and second query portions being encrypted by a second set of encryption keys. For example, the first and second query portions may be different phrases, for example words or word fragments linked by said logical operator (for example AND, OR etc.).

According to an example, the method for searching phrases in an encrypted search index further performs a query permutation function being adapted to forward the encrypted search queries included in the set of encrypted search queries to the search engine in a statistically distributed manner.

According to an example, the method for searching phrases in an encrypted search index further performs a query permutation function being adapted to include random search phrases which are adapted to have no influence on the search result.

According to an example, the method for searching phrases in an encrypted search index further splits the set of encrypted search queries into at least two subsets of encrypted search queries and distributes the subsets of encrypted search queries among different search engines.

According to an example of the method for searching phrases in an encrypted search index, the search engine is executed on a distributed computing system, for example in a cloud environment and the generation of encrypted search queries is performed on a client computing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
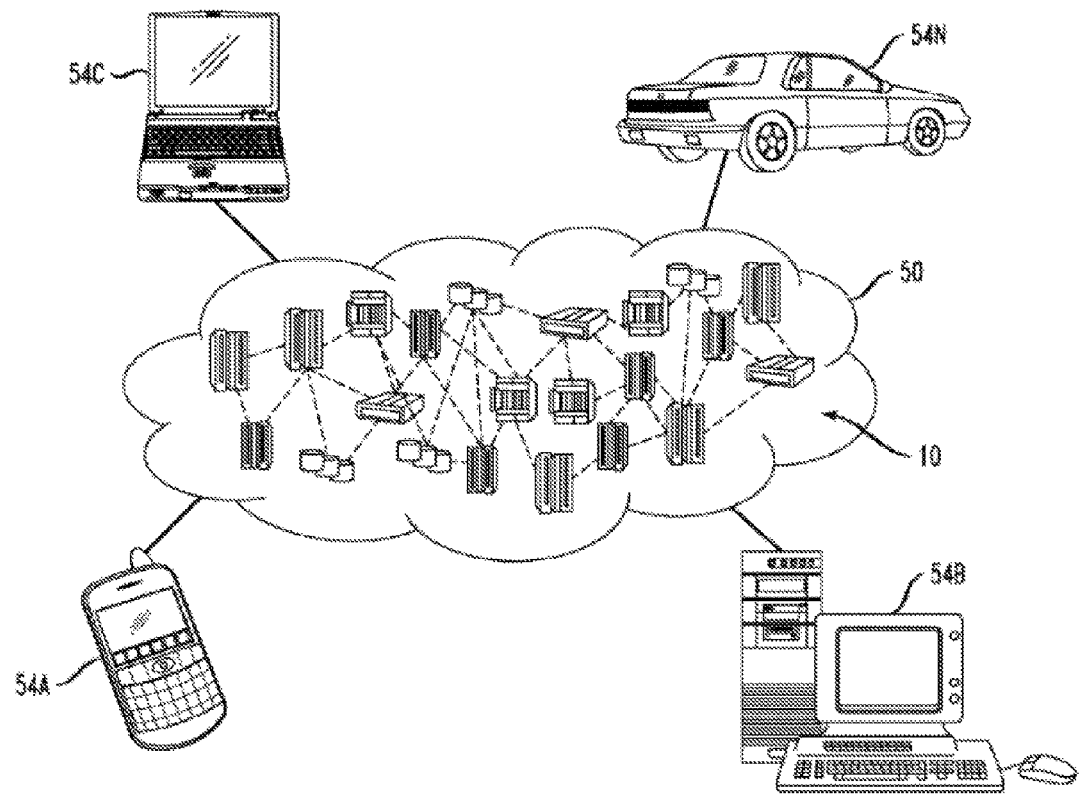
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
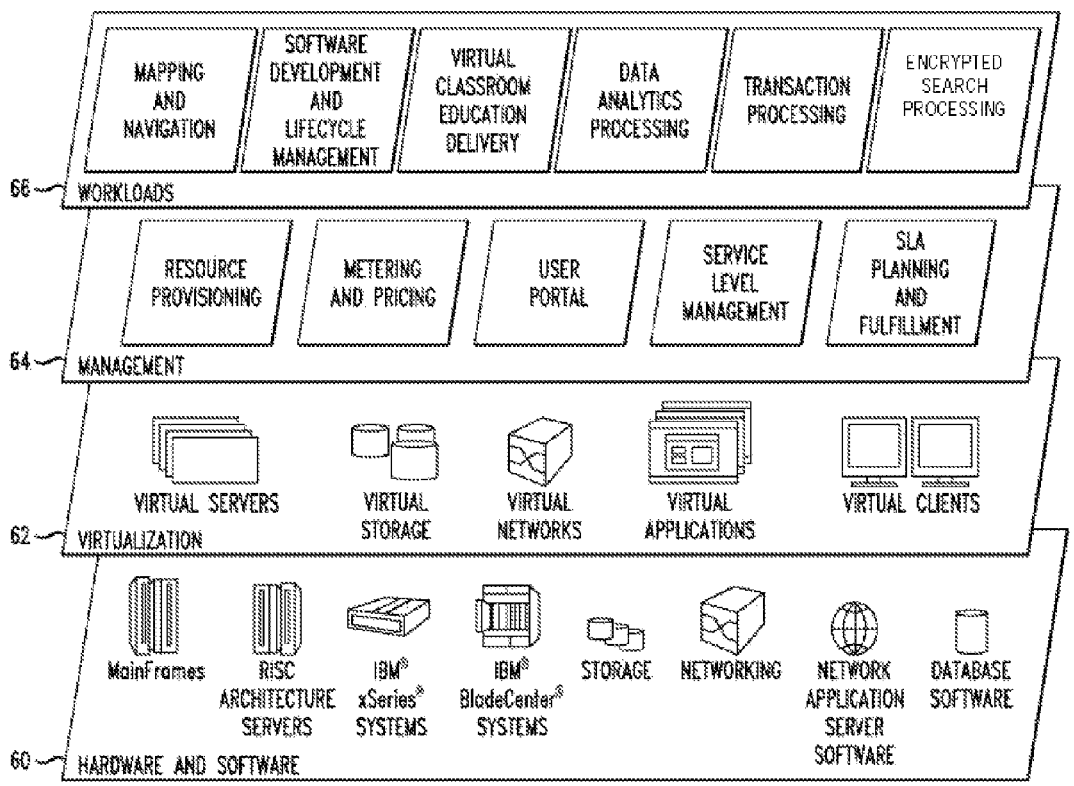
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and encrypted search processing.

Figure 4:
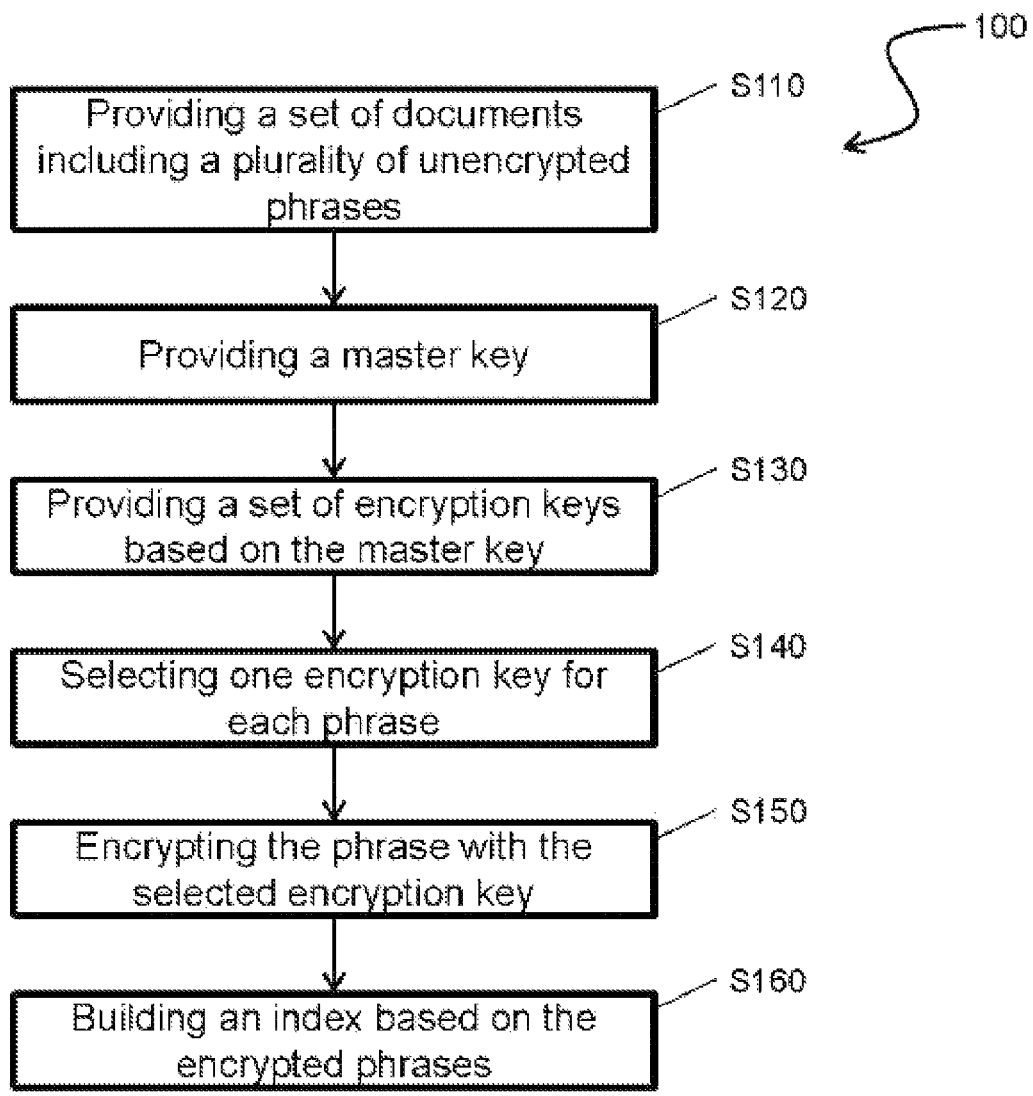
FIG. 4 depicts an example method for establishing a search index based on a flow chart.

FIG. 4 illustrates a method 100 for providing an encrypted search index. The encrypted search index may be adapted to provide performant searches on encrypted documents. For example, the encrypted search index as well as the encrypted documents may be stored in one or more data storages included in a cloud environment. Also, the index engine as well as the search engine may be provided in the cloud environment.

First, one or more documents are provided (S110). The documents may comprise a plurality of unencrypted phrases. For example, the phrases may be words, word portions or character strings included in the documents.

Furthermore, a master key is provided (S120). The master key may be a user-specific key chosen by the respective user. The master key may be not directly used for encrypting the phrases to be included in the index but the encryption keys may be derived from said master key based on a model or mechanism, in the following referred to as key spread model.

Following up, based on the master key, a set of encryption keys are provided or generated (S130). Said set of encryption keys may include one or more encryption keys. Each encryption key included in a certain set of encryption keys is used for encrypting a certain phrase. For example, a set of encryption keys including n keys is assigned to the word "cat" wherein each of said n keys can be used for encrypting the word "cat". So, as a result, after encrypting the word "cat", one of n encrypted phases may be obtained wherein each of said n encrypted phases refer to the word "cat".

As already mentioned before, for obtaining the set of encryption keys a key spread model may be used. The key spread model may receive the phrase to be indexed, the master key and, in case that multiple key spread models are available, an indicator for a certain key spread model. Based on said parameters, the key spread model provides the set of encryption keys including one or more encryption keys. Each of said encryption keys may be used for encrypting the same phrase (for example "cat"). By using different encryption keys for the same phrases, the encrypted search index is immune to frequency attacks.

After providing a set of encryption keys, one encryption key of said set of encryption keys may be selected for encrypting the phrase (S140). For key selection, a key selection model may be used. Said key selection model may be adapted to statistically choose one encryption key out of the plurality of encryption keys included in the set of encryption keys. The key selection model may be a statistical model which receives the set of encryption keys and, preferably, the unencrypted phrase for a random selection of a certain encryption key.

After selecting a certain encryption key, the phrase is encrypted by the respective encryption key (S150) thereby obtaining an encrypted phrase. Preferably, a symmetric encryption method may be used. For example, the encryption method may be Advanced Encryption Standard (AES), for example AES-256.

The obtained encrypted phrase is used for building the search index (S160). In addition, the encrypted phrase may be used for establishing an encrypted document. The encrypted document may comprise a plurality of encrypted phrases, that is the document is encrypted on a word-by-word basis, wherein different words are encrypted by using different encryption keys. So, the encrypted document may comprise a plurality of encrypted phrases being arranged subsequently in the same order as in the unencrypted document wherein at least different phrases may be encrypted by different encryption keys. According to an embodiment, within a certain document, the same encryption key may be used for encrypting identical phrases. However, according to other embodiments, also different encryption keys may be used for encrypting identical phrases of a certain document in order to enhance the robustness against frequency attacks.

Figure 5:
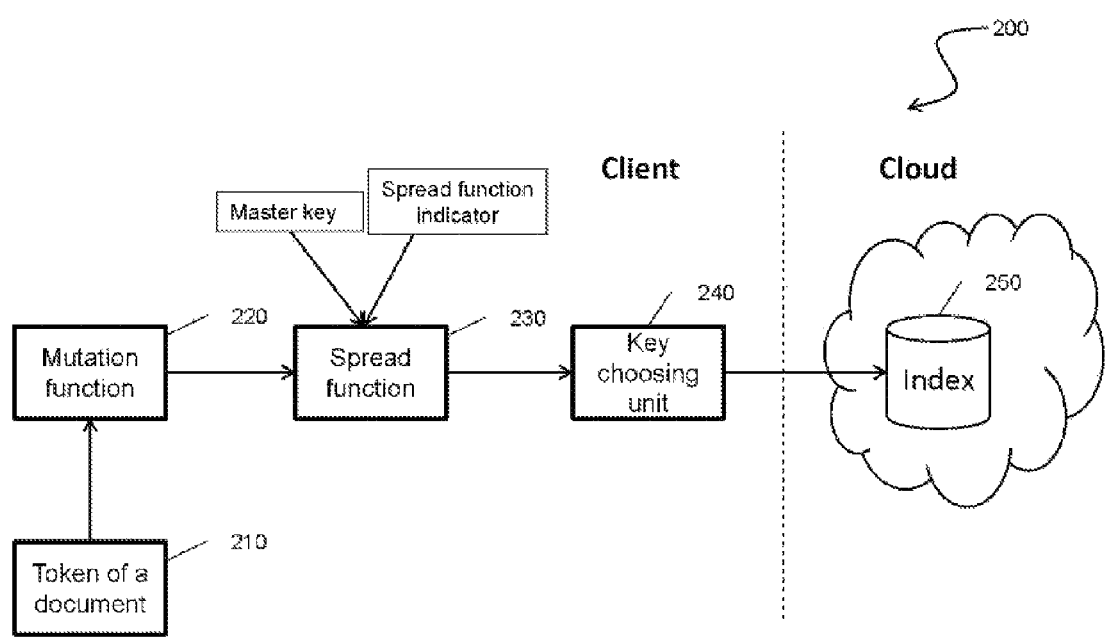
FIG. 5 depicts an example method for establishing a search index based on a schematic block diagram.

FIG. 5 shows an example functional block diagram 200 for generating the search index. As an input of the index generating mechanism, a word, in the following also referred to as token 210 is received. In case that the encrypted index is generated solely based on whole words of a document, a wildcard search, that is a search based on word fragments (for example ca* for searching words like "cat" or "cats") may not be possible or only by using a homomorphic encryption scheme. However, the usage of a homomorphic encryption scheme would require changes to the index engine used for establishing the search index. Such changes to the index engine are undesirable because convention index machines and/or software cannot be used any longer and new established index engines bear the risk of a software or hardware-implemented attack mechanism (back-door). Nevertheless, in order to enable wildcard searches, the index generating mechanism comprises a mutation function 220. The mutation function 220 is adapted to provide one or more phrases based on a given input word, each phrase being an input word itself or a fragment of the input word. For example, the word "tests" may be split into multiple output phrases, for example, "te", "tes" and "test". More specifically, the phrases may be formed by word prefixes, that is a sequence of characters arranged at the beginning of a respective word. Said phrases may be encrypted by respective encryption keys similarly to the whole word in order to enable an indexing of said phrases and thereby enabling a wildcard search. In order to control the performance impact on the index engine, only prefixes that are equal or longer than a certain threshold length are generated. For example, the threshold length may be 3. So, the prefixes have at least a length of three characters.

According to other embodiments, the output phrases may be obtained by using N-grams. In the fields of computational linguistics, an n-gram is a contiguous sequence of n items from a given sequence of text or word. So, word boundaries may not be determined by white space but use the well-established notion of character N-gram indexing and search where a window of N characters (for example N= 3, 4, 5 . . . ) is moved through the text and each character string of length N is considered a phrase and indexed. The spaces between words are often represented as special begin/end pseudo characters (e.g with N=3 the word "cats" may result in the tri-grams ">>c", ">ca", "cat", "ats", "ts<", "s<<" where > and < represent the begin/end pseudo characters). The same is done with phrases at query time with some additional adjustments like requiring the resulting query N-grams for a phrase to occur closely together. This results in somewhat larger index but is often used to provide fuzzy matching or index Asian languages where word boundaries are harder to determine. Similar to using the prefix approach, the phrases derived by the N-gram approach are encrypted by respective encryption keys similarly to the whole word or phrase in order to enable an indexing of said N-gram phrases and thereby a wildcard search. The usage of N-grams is advantageous because combined with proximity restriction (for example WITHIN operator) it allows to provide wide ranging wildcard searches on encrypted data. For example a search for "cat*" would be represented as (">ca" "cat") WITHIN 1 TOKEN IN ORDER. This is more powerful than the approach using prefix words described above.

In addition, it makes decryption attacks based on dictionary frequency on the encrypted index harder since most dictionaries are word/token-based and N-gram statistics are less differentiating (distribution is more uniform than words). Even if an N-gram based approach would be suspected, the size of N would not be known and several different N-gram frequency dictionaries would have to be used.

The whole word as well as the word fragments obtained by the mutation function 220, in the following referred to as phrases are provided to a spread function unit 230. The spread function unit 230 is adapted to provide for each phrase a set of encryption keys. As an input, the spread function unit 230 receives the master key and a spread function indicator, the spread function indicator being indicative for the type of spread function to be used in the spread function unit 230 for generating the set of encryption keys. More in detail, the spread function may be a deterministic function which is adapted to create a set of encryption keys based on a given phrase to be encrypted and based on the master key. As already mentioned before, the spread function indicator may be indicative for a type of spread model to be chosen. The spread model used in the spread function unit 230 may be a word-based spread model, in the following also referred to as token spread model. Token spread model according to the present context refers to any model adapted to determine a number of keys which can be used for encrypting a certain phrase. Due to providing a plurality of different encryption keys, the encrypted index is made immune to frequency attacks. Frequency attacks use the typical frequency of usage of words for investigating the content of a word-by-word-encrypted document. By using multiple different encryption keys for encrypting a phrase, frequency attacks are significantly impeded.

According to an embodiment, the token spread model may be adapted to choose the number of encryption keys to be included in the set of encryption keys based on the frequency of usage of said word. For example, the word "the" is used more often than the word "lounge". So, in order to compensate the different frequency of usage of words, the token spread model is adapted to gather information regarding the frequency of usage of a word to be encrypted and to assemble a set of encryption keys including a number of encryption keys which is dependent on the frequency of usage of the word to be encrypted. For example, there may be a linear dependency between the number of encryption keys and the frequency of words to be encrypted, that is a word being associated with a frequency value of 1000 may comprise a set of encryption keys including 1000 encryption keys, whereas a word being associated with a frequency value of 500 may comprise a set of encryption keys including 500 encryption keys. In addition, there may also be a lower and/or an upper threshold. The lower threshold may ensure, that the set of encryption keys associated with words which occur rarely comprises a fixed number of encryption keys. In addition, the upper threshold value may limit the number of encryption keys of frequently used words to an upper bound in order to limit the computational effort for building the index.

The frequency of usage of words may be derived by a frequency list which indicates the usage of words depending on topics or thematic focus. Based on said frequency list, the word count of a certain word in the index can be estimated. The encryption keys of the set of encryption keys may be derived from the master key using AES-CMAC (Advanced Encryption Standard-Cipher-based Message Authentication Code). Thereby, a desired key separation is achieved.

Apart from using a linear relationship between word frequency and number of encryption keys, advanced methods may use statistics to find the minimum number of keys that are required for the most frequent word in order to make it non-detectable in a frequency attack. Taking the most frequent word as reference, the number of keys to be generated for the other words can be scaled accordingly. Thereby, the effect of generating too many keys leading to a negative impact on performance can be avoided. In addition, the number of keys to be associated with a respective word may be chosen according to an index size assumption. In case that the index outgrows its initial size assumption, the number of keys associated with a certain word can be changed on the fly. In other words, the number of keys can be dynamically adapted to the index size in case that the initial size assumption is significantly exceeded.

After creating the set of encryption keys, said set of encryption keys and the phrase to be encrypted is provided to a key choosing unit 240. The key choosing unit 240 provides a key chooser function adapted to choose one encryption key out of the set of encryption keys. Based on said chosen encryption key, the phrase is encrypted. The key chooser function may be adapted such that within a certain document, identical words are encrypted by the same encryption key. Apart from that, the key chooser function may use a key distribution model which defines a probabilistic distribution of a keyset for a given word. In other words, the key chooser function uses a statistical model for key selection. Due to the statistical model, a random key selection is obtained thereby avoiding a deterministic key selection.

In case that the index is split in multiple indexes (which may be hosted in different cloud environments and/or hosted by different cloud providers), the key selection may be adapted such that there is no overlap between the keys used by different indexes. Thereby, in some embodiments, frequency attacks are significantly complicated.

After encrypting the phrase based on the selected encryption key, the encrypted phrase is transmitted to the index 250. In addition, the respective word in the document is encrypted by using said selected encryption key. The index 250 may comprise at least information regarding which document includes said phrase and at which position(s) in the document the phrase is included.

Figure 6:
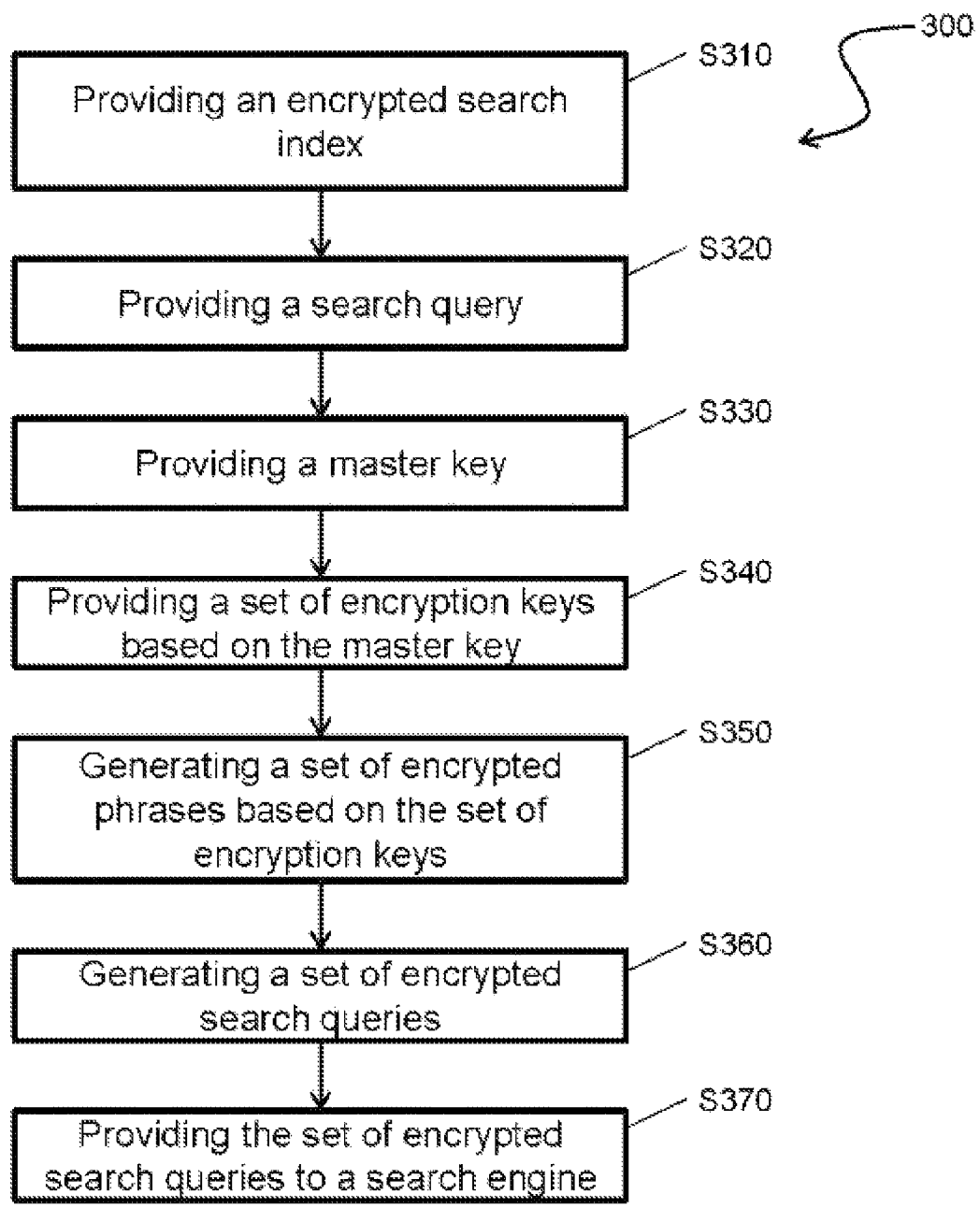
FIG. 6 depicts an example method for processing a search query based on a flow chart.

FIG. 6 illustrates a method 300 for executing a search query on an encrypted index. Due to the encrypted indexing of phrases, the phrase to be searched also has to be encrypted in order to be able to compare the search phrase with the phrases included in the index. First, an encrypted search index is provided (S310). The encrypted search index comprises a plurality of encrypted phrases. The encrypted search index may be established by a method described above with respect to FIG. 4.

As an input of the search query process, a search query is provided (S320). The search query may comprise one or more phrases. For example, the phrase may be a single word (for example cats) or only a word fragment (loung*). For example, the character "*" may indicate that one or more characters may be substituted for any of a defined subset of all possible characters. So, the search phrase "loung*" may return search hits like "lounge", "lounges" etc. of the documents to be searched. In addition, the search query may comprise logical or Boolean operators. For example, a first query portion "cat" and a second query portion "dog" may be concatenated by a logical operator ("AND", "OR" etc.) forming a search query like "cat OR dog".

Furthermore, a master key is provided (S330). The master key may be a user-specific key chosen by the respective user. Similarly to the index generation process, the master key may be not directly used for encrypting the phrase to be searched but the encryption keys may be derived from said master key based on a key spread model.

Following up, based on the master key, a set of encryption keys is provided or generated (S340). Said set of encryption keys may include one or more encryption keys. Each encryption key included in a certain set of encryption keys is used for encrypting a certain phrase. For example, a set of encryption keys including n keys is assigned to the word "cat" wherein each of said n keys can be used for encrypting the word "cat". So, as a result, after encrypting the word "cat", one of n encrypted phases may be obtained wherein each of said n encrypted phases refer to the word "cat".

For obtaining the set of encryption keys, a key spread model may be used. The key spread model may receive the phrase to be searched, the master key and, in case that multiple key spread models are available, an indicator for a certain key spread model. Based on said parameters, the key spread model provides the set of encryption keys including one or more encryption keys. Each of said encryption keys may be used for encrypting the same phrase (for example "cat"). The key spread model may comprise a deterministic key generation process, that is there is no variance in assigning a set of encryption keys to a certain phrase. In other words, a certain phrase always corresponds with a certain set of encryption keys. This guarantees that the search query is processed based on the same set of encryption keys used for building the search index.

After providing a set of encryption keys, one or more sets of encrypted phrases are generated (S350). For example, considering the search phrase "cat AND dog", two sets of encrypted phrases are generated, one for the phrase "cat" and one for the phrase "dog". Each set of encrypted phrases may include multiple different encrypted phrases for the same unencrypted phrase because multiple encryption keys are associated with said unencrypted phrase. It is worth mentioning that, in order to be able to perform a complete search, the set of encrypted phrases associated with a certain unencrypted phrase comprises as many encrypted phrases as encryption keys are included in the set of encryption keys.

Based on the set(s) of encrypted phrases, a set of encrypted search queries is generated (S360). The set of encrypted search queries may comprise multiple search queries which consider the query structure of the search query provided as an input to the query execution process and the plurality of encryption keys associated with the search phrases included in the search query. For example, in case that the search query comprises a single word (for example "cat") and the set of encryption keys associated with said word comprises n encryption keys ($ek_1$ to $ek_n$), the set of encrypted search queries comprises n search queries ($sq_1$ to $sq_n$), wherein each search query is obtained by encrypting the search phase (for example "cat") with one of said encryption keys ($ek_1$ to $ek_n$). According to another example, in case that the search query comprises multiple phrases concatenated with a logical operator (for example "cat" AND "dog"), wherein the first phrase ("cat") is associated with n encryption keys and the second phrase ("dog") is associated with m encryption keys, the set of encrypted search queries comprises n*m search queries for covering all possible permutations.

Finally, the set of encrypted search queries is provided to a search engine (S370) in order to perform searches on the encrypted search index based on the encrypted search queries. The search query may be performed in a cloud environment, wherein the steps 310 to 370 described before are performed on a client system and the search engine as well as the search index are hosted in a cloud environment.

Figure 7:
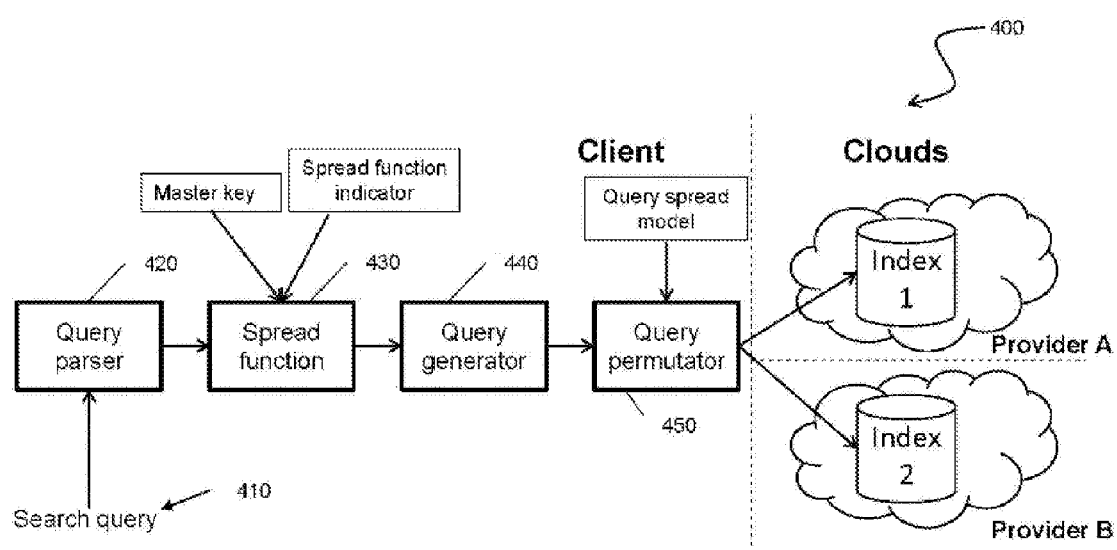
FIG. 7 depicts an example method for processing a search query based on a schematic block diagram.

FIG. 7 illustrates the search process 400 based on a functional block diagram. The search query 410 may be provided to a query parser 420. The query parser 420 may be adapted to prepare a search tree. The search tree may comprise leaves and nodes, wherein the leaves are constituted by phrases (for example "cat", "dog", "ca*", etc.) and the nodes are constituted by logical operators (for example AND, OR, etc.). In other words, the query parser 420 is adapted to identify phrases within the search query 410 which have to be encrypted later on.

Each phrase identified by the query parser 420 is forwarded to a spread function unit 430 being adapted to apply a spread function to each of the identified phrases. The spread function unit 430 is adapted to provide for each phrase a set of encryption keys. As an input, the spread function unit 430 may receive the master key and a spread function indicator, the spread function indicator being indicative for the type of spread function to be used in the spread function unit 430 for generating the set of encryption keys. The functionality of the spread function unit 430 may be identical to the spread function unit 230 of FIG. 5 described before. Therefore, the technical features of the above-described spread function unit 230 also apply to the spread function unit 430 according to FIG. 7. Specifically, the spread function unit 430 may also comprise a mechanism for providing a set of encryption keys including a number of encryption keys, wherein the number of encryption keys depends of the frequency of usage of said word. Thereby, frequency attacks are significantly impeded. So, as a result, the spread function unit 430 may provide for each phrase included in the search query a set of encryption keys (including one or more encryption keys) which may be used for encrypting the respective phrase.

The sets of encryption keys provided by the spread function unit 430 as well as information regarding the structure of the search tree are provided to a query generator 440. The query generator 440 may provide an extended search query covering all search queries which are possible based on the logical structure of the input search query and the different encryption keys of the respective search phrases. In case that the search phrase is "cat AND dog" and "cat" is associated with encryption keys [k1, k2, k3] and the search phrase is "dog" associated with encryption keys [k4, k5], the extended search query may be:

(k1 (cat) OR k2(cat) OR k3(cat)) AND (k4(dog) or k5(dog))

wherein kx(yyy) stands for the phrase "yyy" being encrypted by the encryption key kx etc.

According to an embodiment, the query generator 440 may be adapted to provide a disjunctive normal form (DNF) of the extended search query, that is:

k1 (cat) AND k4(dog) OR
k2(cat) AND k4(dog) OR k3(cat) AND k4(dog) OR
k1 (cat) AND k5(dog) OR
k2(cat) AND k5(dog) OR
k3(cat) AND k5(dog)

The extended search query may be provided to a query permutator unit 450. The query permutator unit 450 may be adapted to split the extended search query into multiple search queries, for example based on the upper-mentioned DNF-query structure. Said multiple search queries may have random but semantically equivalent operator trees. In addition, random phrases may be included by the query permutator unit 450 in the search queries in order to confuse attackers. Said random phrases may not have any influence on the search result but may be construed such that a possible attacker may consider the random phrases as being an integral part of the search query leading to confusion. The query permutator unit 450 may use a query spread model indicator as an input, said query spread model indicator instructing the query permutator unit 450 how to perform the query permutation process. For example, the query permutator unit 450 may be adapted to execute several different query spread models and the query spread model indicator may be indicative for the respective model to be chosen. For example, the query spread model to be chosen may be selected randomly.

After performing query permutation by the query permutator unit 450, the modified search queries are provided to one or more search engines for performing the search based on one or more search indexes. According to an embodiment, the modified search queries are performed on a single search index in a cloud environment. According to another embodiment, the modified search queries may be distributed on different search indexes which may be provided by different providers in different cloud environments. According to FIG. 7, for example, the index 1 is hosted by provider A whereas the index 2 is hosted by provider B. The distribution of the search queries by the query permutator unit 450 is chosen such that none of the indexes receives all encrypted phrases being associated with a certain phrase. Thereby it is not possible for a provider to have knowledge of all encrypted phrases belonging to one and the same (plain-text) phrase.

Some embodiments of methods for establishing search indexes and performing searches on encrypted data has been presented. Thereby, in some embodiments, an encryption scheme is provided which:
  has almost the access time characteristics of an unencrypted index;
  does not leak the access pattern;
  requires a constant amount of communication rounds, that is one search query is responded by one search response;
  is immune to frequency attacks;
  can be implemented on well-known index engines, that is no modifications of index engines are necessary.

Some embodiments may have one, or more, of the following features, characteristics and/or advantages:
  the index engine cannot learn about the nature of the documents in the index;
  no word frequency analysis can be performed on the index, because different keys are used for the same phrases;
  accessing/analyzing the index does not reveal which groups of encrypted phrases represent the same unencrypted phrase;
  the methods can be used with all existing index engines and thus there is no chance that an attack vector exists in the index engine;
  the secret keys does not have be exchanged with the indexing vender and can stay on the users side ("user side" may be any client working with the search/indexing system or a proxy on the user side that perform the encryption before leaving the user side).

What is claimed is:

1. A computer-implemented method for searching phrases in an encrypted search index, the method comprising:
  providing, to a computing device, an encrypted search index including a plurality of encrypted phrases;
  providing, to the computing device, a search query to be applied on the search index, the search query including a set of unencrypted phrase(s) to be searched;
  providing, to the computing device, a master key;
  determining, by the computing device, a first frequency parameter for a first unencrypted phrase of the set of encrypted phrase(s) based on a frequency evaluation scheme, the first frequency parameter indicating the number of encryption key(s) to be included in the set of encryption key(s) corresponding to the first unencrypted phrase, and wherein the frequency evaluation scheme used in determining the number of encryption key(s) for the first unencrypted phrase is based on a frequency of usage of the first unencrypted phrase as indicated by a reference frequency list;
  providing, to the computing device and based on the master key, a set of encryption key(s) for each phrase of the set of unencrypted phrase(s);
  generating, by the computing device, a set of encrypted phrase(s) respectively corresponding to the set of unencrypted phrase(s) by encrypting the each unencrypted phrase of the set of unencrypted phrase(s) respectively based on its corresponding set of encryption key(s);
  generating, by the computing device, a set of encrypted search query(ies) corresponding to the set of encrypted phrase(s); and
  providing, by the computing device, the set of encrypted search query(ies) to a search engine designed to perform searches on the encrypted search index.

2. The computer-implemented method of claim 1, wherein the set of encrypted search query(ies) includes a plurality of synonymous encrypted search queries, each synonymous encrypted search query having a similar logical structure and being constituted by encrypting phrase synonymous with a corresponding phrase of the set of unencrypted phrase(s).

3. The computer-implemented method of claim 1, wherein:
  the set of encrypted search query(ies) includes a first operator, a first query portion and a second query portion;
  in the first search query, the first query portion and the second query portion are logically linked by the first operator; and
  the set of encrypted search query(ies) further includes all permutations of the first query portion as encrypted by a first set of encryption keys and second query portion are encrypted by a second set of encryption keys.

4. The computer-implemented method of claim 1, further comprising:
  performing a query permutation function to forward the set of encrypted search query(ies) to the search engine in a statistically distributed manner.

5. The computer-implemented method of claim 1, further comprising:
   performing a query permutation function being adapted to include random search phrases which are designed to avoid having any influence on the search result.

6. The computer-implemented method of claim 1, further comprising:
   splitting the set of encrypted search queries into a plurality of subsets; and
   distributing the subsets among a plurality of search engines.

* * * * *